June 30, 1970     A. M. MARKS     3,518,461

CHARGED AEROSOL POWER CONVERSION DEVICE AND METHOD

Filed June 23, 1967     4 Sheets-Sheet 1

FIG. 1 — ELECTROJET PROCESS

FIG. 2 — EXPANSION-CONDENSATION PROCESS

FIG. 3 — MIXTURE-CONDENSATION PROCESS

FIG. 5 — NEUTRALIZATION PROCESS

FIG. 4 — MIXTURE-CONDENSATION PROCESS

INVENTOR.
ALVIN M. MARKS

BY *Albert F. Kronman*

ATTORNEY

INVENTOR.
ALVIN M. MARKS

BY
ATTORNEY

FIG. 9

June 30, 1970  A. M. MARKS  3,518,461
CHARGED AEROSOL POWER CONVERSION DEVICE AND METHOD
Filed June 23, 1967  4 Sheets-Sheet 4

FIG. 10

INVENTOR
ALVIN M. MARKS
BY
ATTORNEY

United States Patent Office 3,518,461
Patented June 30, 1970

3,518,461
CHARGED AEROSOL POWER CONVERSION DEVICE AND METHOD
Alvin M. Marks, 153—16 10th Ave.,
Whitestone, N.Y. 11357
Filed June 23, 1967, Ser. No. 648,403
Int. Cl. H02n 3/00
U.S. Cl. 310—10                              27 Claims

ABSTRACT OF THE DISCLOSURE

Power conversion devices are disclosed employing charged aerosols capable of efficient power transduction. The charged aerosol comprises a suitable concentration of charged liquid droplets or aggregates in a carrier gas. To achieve highly effective power transduction, the charged liquid droplets or aggregates are controlled to have an optimum ratio of radius to the number of charges. This optimum ratio is derived for various operating conditions. Processes and devices are described for producing charged droplets or aggregates having an optimum ratio, and decreased space charge.

INTRODUCTION

The charged particle employed in certain embodiments of this invention is a charged liquid droplet. In other embodiments, charged solid aggregates are used. One such solid comprises rodlike submicron microcrystals. Submicron solids are capable of being fluidized by suspension in a fluid.

The ratio of the radius of the charged droplet to the number of charges per droplet is hereinafter referred to as the "ratio." The "optimum ratio" is defined as a ratio required for a specific small slip factor, for efficient power transduction. The radius is usually expressed in Angstroms (A.), ($10^{-10}$ m.), and the unit charge is the charge on the electron. The "ratio" is therefore expressed in A./electron charge. Since most of the processes described herein involve charged "droplets," this term will be used, but it will be understood that the "ratio" could as well apply to other types of particles. For singly charged particles the ratio and the radius are numerically the same.

A mathematical-physics analysis is hereinafter presented which derives optimum values for the radius, charge and ratio of a charge particle to enable it to act as an efficient power transducer under a variety of conditions.

BACKGROUND OF THE INVENTION

Power conversion devices employing a charged aerosol as a working substance are now well known; such a device is disclosed in U.S. Pat. No. 2,638,555 issued May 12, 1953 to Alvin M. Marks in which preformed aerosol particles produced by a suitable aerosol generator were subsequently charged by the diffusion of ions produced by a corona field.

The charging of the preformed aerosol by such means requires considerable power input in relation to the obtainable output power, and it is difficult to control the number of charges relative to the dimensions of the particle.

In the present invention it is preferred to utilize two other very efficient basic processes known as the "electrojet process" and the "condensation process" for simultaneously forming and charging a liquid aerosol, with means to control the ratio as hereinafter described. With these two processes only about 0.1% of the output power is used to charge the aerosol.

A power conversion device employing a charged aerosol formed by the electrojet process is disclosed in U.S. Pat. No. 3,191,077 issued June 22, 1965, to Alvin M. Marks and Ernesto Barreto. In this process charged droplets are generated in a moving gas stream from an axially located capillary tube and a ring electrode, with an electric field between the end of the capillary tube and the ring electrode. The "electrojet process" simultaneously produces and charges the aerosol but may provide too many charges per droplet; that is, too small a ratio. When the ratio is too small power transduction is not efficient. The present invention provides control means to produce charged droplets having an optimum ratio. One control means utilizes the disruption of a multiply charged droplet, and division of its charges over many smaller droplets. Another control means employs the partial neutralization of the excess charge on a droplet.

Another power conversion device employing a charged aerosol formed by the "condensation process" is disclosed in an application for patent entitled "Method and Apparatus for Producing Charged Aerosols," Ser. No. 438,930, filed Mar. 11, 1965, in the name of Alvin M. Marks. In this device a gas-vapor cools by expansion as it flows through a corona produced by an electric field. Vapor condenses on ions from the corona to simultaneously produce and charge an aerosol droplet. These droplets are generally singly charged and continue to grow as they move downstream, but may not attain a sufficiently large radius for efficient power transduction. A control means is required to provide droplets having an optimum ratio.

In a charged aerosol having a suitable charge density, efficient power transduction occurs when the slip velocity of the charged particle is less than 10%, and preferably about 1% of the carrier gas velocity, while utilizing a maximum electric field intensity. The maximum electric field intensity is just under that which causes incipient sparking under the given operating conditions. These conditions require a charged droplet having approximately an optimum ratio.

It is preferred to use liquid rather than solid particles because they are readily formed and charged simultaneously, and have other advantageous properties. However, submicron particles of an optimum radius such as microcrystals may be suspended in a fluid to form a colloidal suspension. Such a colloidal suspension has the properties of a fluid which facilitates its introduction and removal from the power transducing devices of this invention.

SUMMARY OF THE INVENTION

In one preferred form of the invention, multiply charged droplets are formed by the electrojet process as they issue from a small orifice in an electric field into a carrier gas at an elevated pressure and temperature.

As the charged droplets increase in temperature, they disrupt and form smaller charged particles. The control means comprises selecting suitable liquid temperature and pressure, carrier gas temperature and pressure, and electric field intensity at the jet orifice, to obtain charged particles having the optimum ratio.

In another form of the invention, liquid is heated to a temperature near the boiling point and forced under pressure through an orifice in an electric field, into the carrier gas at lower pressure but near the same temperature. This causes the liquid to explode into very small charged droplets. The radius and charge per droplet are controlled by the choice of the pressure and temperature of the liquid, the pressure and temperature of the carrier gas, and the electric field intensity, to provide an optimum ratio.

Still another form of the invention employs a supercooled vapor which condenses upon very small singly charged aerosol droplets which grow to form charged droplets of larger radii having an optimum ratio. The control means to obtain charged droplets having an optimum ratio comprises temperatures, pressures, vapor concentrations, flow distances and time.

A further form of the invention employs a charged aerosol initially formed with too many charges per particle, and charging electrodes for the emission of oppositely charged ions for partially neutralizing these charges, whereby the charge on the charged droplets is decreased until an optimum ratio is attained.

In another form of the invention liquid issues from the orifice of a capillary tube of small internal diameter in an intense electric field; whereby a charged droplet disrupts into many droplets having smaller radii. The process is continued until charged droplets emerge from the electric field with an optimum ratio. The control means comprises a choice of a suitably small orifice diameter, the liquid pressure, and the electric field intensity.

Another form of this invention employs preformed emulsions having droplets of the required radius suspended within an immiscible evaporable fluid from which multiply charged droplets containing the suspended particles are produced. These charged droplets then evaporate, distributing the charge over small charged droplets of predetermined radii. Alternatively, a suspension of submicron solid particles may be employed.

An object of this invention is to decrease the space charge effect through the employment of electrically oriented charged dipolar particles in the conversion space. The charged dipolar particles may comprise elongated microcrystalline or whisker rods of submicron dimension. These are capable of orientation in the electric field within the power conversion region of the device. Such orientation produces a decrease in the space charge. With the decrease in the space charge at a given level of power density, lower voltages and greater current densities may be employed.

DESCRIPTION OF THE DRAWINGS

In the accompanying drawings, forming a part hereof, are illustrated several embodiments of the invention in which drawings similar reference characters designate corresponding parts and in which:

FIG. 1 is a somewhat diagrammatic view in longitudinal section of a power transducer employing a charged aerosol as a working medium according to the present invention, utilizing the electrojet process.

FIG. 2 is a somewhat diagrammatic view in longitudinal section of another form of power transducer employing a charged aerosol as a working according to the present invention, utilizing the expansion condensation process.

FIG. 3 is a somewhat diagrammatic view in longitudinal section of a third form of power transducer employing a charged aerosol as a working medium, utilizing the mixture condensation process.

FIG. 4 is a somewhat diagrammatic view in longitudinal section to a fourth form of power transducer employing a charged aerosol as a working substance employing another form of mixture condensation process.

FIG. 5 is a fragmentary view in longitudinal section of still another form of the invention employing an emitting charging electrode for adjusting the ratio, by the neutralization process.

FIG. 6 shows a modified electrojet device in which the fluid comprises a colloidal suspension of aggregates. The charged droplets initially formed contain small aggregates which are subsequently dispersed and charged.

FIG. 7 shows a fragmentary view in longitudinal section of the orifice of the device shown in FIG. 6, showing the initial formation of a charged droplet containing the suspension of smaller aggregates, and its breakup into smaller charged particles.

FIG. 8 shows the enlarged detailed view of a portion of the conversion space of FIG. 6, showing idealized electrically charged aggregates comprising charged dipolar particles which are oriented in the electric field; whereby the space charge effect is decreased.

FIG. 9 shows on a log-log graph scale relative gas density vs. the optimum radius of charged droplets for various values of a parameter, as hereinafter described.

FIG. 10 shows on a log-log scale the optimum radius of the charged droplet and optimum ratio vs. the number of charges per particle for a charged aerosol power transducer operating at atmospheric pressure.

DESCRIPTION OF THE PREFERRED EMBODIMENTS—THE ELECTROJET POWER TRANSDUCERS

Referring to the drawings and particularly to FIG. 1, 10 indicates a power transducer employing a charged aerosol as a working medium such as has been described in U.S. Pat. No. 2191,077. This device, hereinafter referred to as the electrojet transducer, is built into a conduit 11 through which a carrier gas flows under pressure. A portion of the conduit is constricted as shown at 12 to form a throat to increase the velocity of the gas. However, the device will operate in a straight tube. A source of fluid 13 under pressure, such as the fluid in container 14, is connected to a small diameter capillary tube 15 which emits the fluid in the presence of an electric field, causing the formation of multiply charged droplets, which disperse into the moving carrier gas 19 at the throat 12.

A charging electrode, which may be a ring 16 connected to a DC source 17, is positioned around the dispensing end of the tube 15 and forms part of the throat 12.

The conversion space where power transduction occurs is located between the charging electrode 16 and the collector electrode 20. The collector 20 may comprise a plurality of points placed within the conduit 11. The load 22 is connected between the collector points 20, and the emitter tube 15 which is connected to grounded conduit 11 at 23. The conduit downstream of the tube leads to the throat and opens to form the power conversion space for the charged aerosol. In this region the conduit is of insulating material.

Various methods for attaining charged droplets having an optimum ratio, utilizing effects employing more of the control variables, are hereinafter described.

The effects due to variation of the following factors are discussed: temperature, pressure, electric field intensity, flash expansion, composition of the liquid, suspensions of liquid or solid particles and charged electric dipoles.

(a) Effect of temperature increase

In the device of FIG. 1, the carrier gas, according to one modification of the present invention is at an elevated pressure and temperature. The fluid 13 is initially cool, contained within an insulated capillary tube 15. Relatively large multiply charged droplets 18 are formed from the cool fluid and emitted from the end of the tube 15 at its interface with the gas. As the droplets 18 enter the carrier gas 19 at an elevated temperature, they disrupt the smaller charged droplets **18*a***.

Efficient power transduction with a charged aerosol device depends upon the formation of charged particles having an optimum ratio, which are obtained in this case by an increase in temperature of the initially formed multiply charged droplets. The increase in temperature of the multiply charged droplet causes a decrease in surface tension, an increase in internal pressure, and an increase in the vapor pressure of the liquid relative to the vapor pressure of the carrier gas. The decrease in surface tension with increased temperature follows a well known law which is hereinafter described.

At critical temperature and pressure the surface tension of a liquid decreases to zero and single charges then attach to individual molecules, or small aggregates of molecules.

The dimensions of the charged droplet depend upon the balance between the cohesive force of the surface tension and the repulsion due to outward force of the multiple electrical charges on the surface of the droplet. The outward forces due to internal pressure, and the outward forces due to the excess of the vapor pressure of the liquid over that of the carrier gas. When these outward forces exceed the cohesive force due to surface tension, the initially formed charged droplet disrupts into many smaller droplets; and the initial charge is distributed over the number of smaller droplets produced.

If multiply charged droplets, produced using a cool liquid jet at a high pressure, are introduced into the carrier gas at elevated temperature and somewhat lower pressure, the charged droplets increase in temperature within the carrier gas, and disrupt until there is about one charge/droplet. For example, a charged droplet produced at 20° C. and having a radius of $1\mu$ or 10,000 A. has $1.25 \times 10^5$ charges, and a ratio ($10^4/1.25 \times 10^5$) or 0.08. However, if a ratio of 200 A./electron charge is required for efficient power transduction, this ratio may be attained, by disrupting this charged droplet into $1.25 \times 10^5$ charged droplets each about 200 A. radius, having about one electron charge/droplet. It will be shown hereinafter that under certain conditions of operation, an optimum ratio is 200 A./electron charge. It is thus shown how disruption may be utilized to produce the optimum ratio.

(b) Flash expansion

Figure 1:
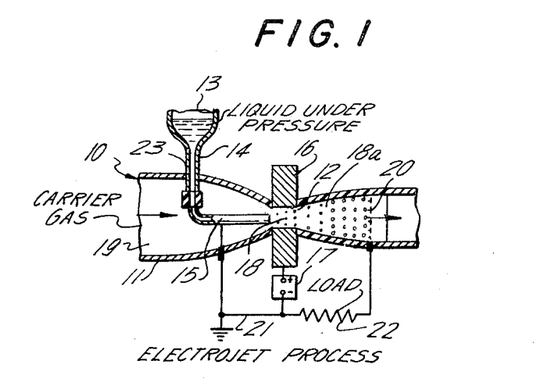

Charged droplets having an optimum ratio may be attained by flash-expansion using the transducer as shown in FIG. 1. In this figure, a liquid 13 such as water is passed through a tube 15 of small diameter in an intense electric field into a gas stream 19. The liquid is maintained at a high pressure and temperature and issues into the gas stream at lower pressure and about the same temperature. The liquid is thereby partially flash-expanded to vapor and forms charged liquid droplets. The charged droplets are initially formed in an intense electric field and during flash expansion form smaller charged liquid particles of optimum ratio. The control factors which are adjusted until the optimum ratio is attained are: the temperature and pressure of the liquid 13; the temperature and pressure of the carrier gas 19; the electric field intensity; and, the liquid composition.

(c) Effect of electric field intensity

With certain modifications, the transducer shown in FIG. 1 may be used to produce charged aerosol particles having an optimum ratio by applying an intense electric field as the charged droplets are forming. In this embodiment the capillary tube 15 is made of an insulating material such as glass. The glass capillary 15 is drawn so that its inside diameter is 1–25 microns at its orifice.

The electric field intensity at the orifice of the tube is inversely proportional to the square of the orifice diameter. Thus, at smaller diameters the electric field intensity increases greatly. With large electric field intensities the charges within the droplets separate and dipolar forces come into action. If the dipole electrical stretching forces exceed the surface tension, the charged droplets are then literally torn apart. The charged droplets having an excess of charge disrupt further and their initial charge is divided amongst smaller droplets. Dipolar disruption does not occur in weak electric fields because the electrical stretching force is then too small. The electric field intensity, orifice diameter and fluid pressure, as well as other factors herein described, may be adjusted to provide an optimum ratio.

(d) Effect of droplet composition

Another method of control utilizes a working substance which has a smaller surface tension than water; for example, an alcohol such as ethanol. Other well known common chemical means such as surfactants may be employed to cause a disruption of multiply charged droplets such as to attain an optimum ratio. The surfactant is preferably of known nonionic type.

Charged particles of optimum ratio may be produced by the electrojet method utilizing a two component miscible liquid solution; in which a first component is readily evaporable, under the conditions of operation. Examples of such liquids are acetone and water; water and glycerin, etc. The droplet gets smaller as one component evaporates and the excess of charges on the smaller droplet causes it to disrupt until an optimum ratio is attained.

(e) Droplets containing suspensions

Figure 7:
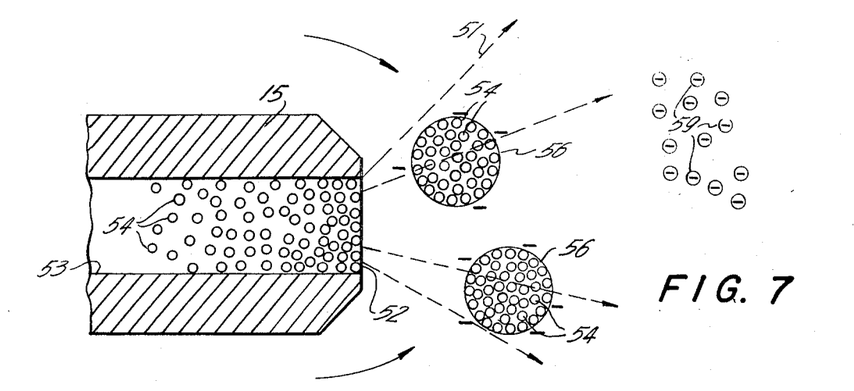

FIG. 7 shows a magnified view of a small diameter tube 15 which serves as a fluid conveying electrode of the electrojet device as previously described. The charging electrode is not shown but the electric field lines are shown as dashed lines 51 terminating on the exposed surface 52 of the fluid suspension 53 at the orifice of the tube 15. The fluid suspension 53 contains smaller solid or liquid particles 54 suspended within the fluid. The particles 54 may comprise large molecules, submicron immiscible small liquid droplets, or microcrystals having the requisite dimensions.

Relatively large multiply charged droplets 56 are emitted from the surface 52. Conditions are adjusted so that the surface of the multiply charged droplet 56 has an average of N charges/droplet, shown as negative charges distributed over the surface, and contains approximately N smaller particles 54. The fluid of the droplets 56 evaporates as they issue into the carrier gas 19 at an increased temperature, causing the expulsion of the smaller particles 54. These form small diameter singly charged particles 59.

For example, a nonmiscible fluid such as an oil, may be emulsified in known manner with the water so that the emulsified oil droplets have a radius of 300 A. within a larger multiply charged droplet of 10,000 A. radius. The smaller droplets may comprise mineral oil, silicone oil, diphenyl chloride; liquid metals such as mercury, gallium; or may comprise solid particles of colloidal dimensions capable of being readily suspended within a fluid such as water. For example, chrystolite fibers which are approximately 3000 A. long x 150 A. in diameter are readily suspended in silicone oil or in water and may be utilized as the particle suspension in one of these vaporizable fluids.

Other solid particles which easily form suspensions are well known in the art. For example, they may comprise polymeric microcrystals such as cellulose, amylose, collagen and the like, which form aggregates in the range required.

In previous work with the charged aerosol generator, it has been preferred to use charged liquid droplets, and to avoid solid particles, because solid particles tend to cake walls and electrode surfaces. However, solid particles which are capable of ready dispersion to form a fluid suspension, retain the advantages of a liquid medium.

(f) Charged dipolar particles

The space charge effect with spherical charged particles necessitates a short distance between the entrance plane 64 and the exit plane 65, and limits the current flow across these planes without spark breakdown. The space charge effect may be partially overcome using charged oriented dipolar particles.

Figure 6:
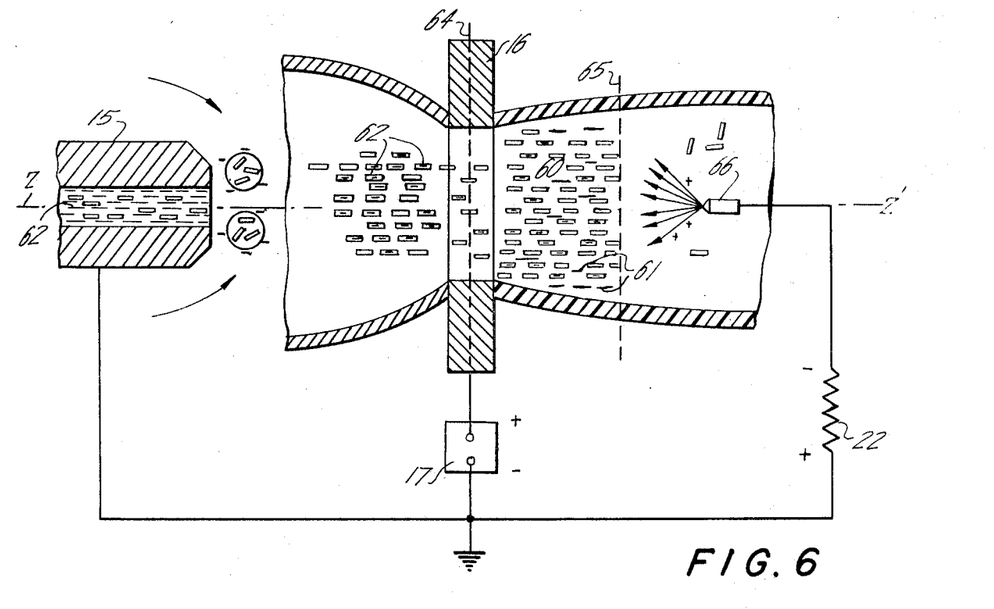

FIG. 6 shows an electrojet power transducer which is similar to that of FIG. 1 except that charged dipolar particles 62 are employed as the charged aerosol in the conversion space 60. The particles 62 are submicron in size, rod-like in shape, capable of orientation in an electric field and of forming a gaseous suspension. Known dipolar gas molecules may also be used to increase the electric polymerization.

Figure 8:
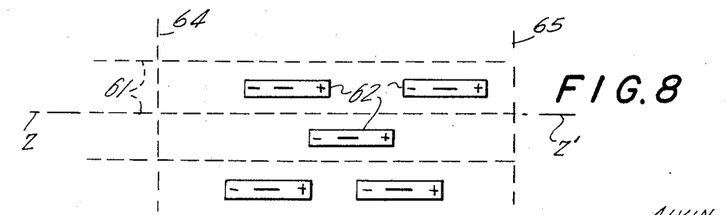

FIG. 8 shows a magnified view of a portion of the conversion space 60 in FIG. 6. The internal electric field 61 in the conversion space is shown as dashed lines parallel to the ZZ' axis of the device. The rod-like particles 62 have an excess charge, such as a negative charge.

The induced dipole moment causes the rod-like particles 62 to rotate into parallelism with the electric field lines, which diminishes the space charge effect in the power conversion space between the planes 64 and 65. The charged oriented dipole particles in a gaseous suspension constitutes a novel working substance; an anisotropic charged aerosol as an electrothermodynamic medium.

The decrease in the space charge effect is of great importance because it permits smaller votages, greater currents, and greater electrode distances, at a given electric power output.

As an example of a rod-like conducting particle suitable for use as a charged dipolar particle, submicron microcrystals comprising conducting or semiconducting rod-like whiskers are preferred. Examples of conducting rod-like particles include metallic rod-like whiskers such as aluminum nickelide, chromium, etc. These microcrystals are known in the art and are now available commercially. Such microcrystals can also be readily suspended in fluids for introduction, charging and suspension by the electrojet method, and may be removed from the power conversion device by resuspension in the condensate fluid.

CONDENSATION TRANSDUCERS

Various methods involving condensation for the production of charged aerosol droplets having an optimum ratio, are described hereinafter.

(a) Expansion condensation

Figure 2:
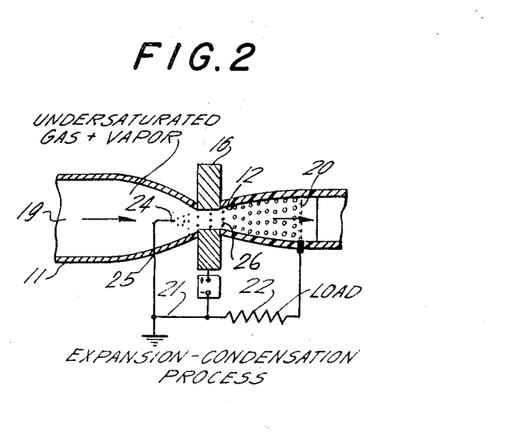

In FIG. 2 there is shown another transducer employing a charged aerosol as a working substance, which has been previously disclosed in application for patent, Ser. No. 438,930, filed Mar. 11, 1963. This device utilizes the "condensation process" for the production of charged droplets, and is hereinafter referred to as an "expansion condensation transducer." The expansion-condensation transducer employs a conduit 11, a constriction 12 in the conduit and a charging electrode 16 in the form of a ring at or near the constriction.

A small diameter wire 24 such as a tungsten wire, forming a point of about 0.01 mm. radius, is located within the conduit 11, and may be grounded thereto as indicated at 25. The point of the wire 24 is spaced upstream a short distance from the charging electrode 16 and preferably coaxial with the conduit 11. A potential difference is supplied by a source connected between the point 24 and the charging electrode 16. As a result, an intense electrical field terminates upon the wire point, and ions are emitted into the moving carrier gas, constituting an electric current.

With the voltage on the charging electrode adjusted to be just under sparking, the current output from the emitter point increases linearly with the carrier gas pressure. For example, at a pressure of about 4 atmospheres, 150 microamps current of gas ions is emitted from the wire point 24 into the carrier gas vapor 19.

The carrier gas-vapor 19 containing the ions is continuously cooled by expansion in the nozzle in the vicinity of the charging electrode 16. The supercooled vapor in the gas 19 condenses upon each ion to form a singly charged liquid droplet which has an initial ratio which may be too small for efficient power transduction. An increase of ratio to optimum requires an adequate growth of the charged droplet which in turn depends upon the degree of supercooling, and the time the droplets dwell in the formation region. The dwell time for growth depends on the gas velocity and the distance between the point 24 and the charging electrodes 16. For example, at a velocity of 500 m./sec. and a distance of 5 mm. or $5 \times 10^{-3}$ m.; the dwell time is $10^{-5}$ sec. or 10 $\mu$sec.

To obtain the optimum ratio, the vapor must be sufficiently supercooled by expansion. This requires that the carrier gas be greatly expanded at the nozzle throat 26. Under these circumstances the gas velocity may become sonic at the throat, and even supersonic downstream, causing large frictional power losses. Efficient power transduction is achieved by avoiding friction power losses by utilizing processes for producing charged droplets of optimum ratio in the processes illustrated in FIGS. 3 to 8 inclusive, as hereinafter described.

(b) Mixture condensation

Figure 3:
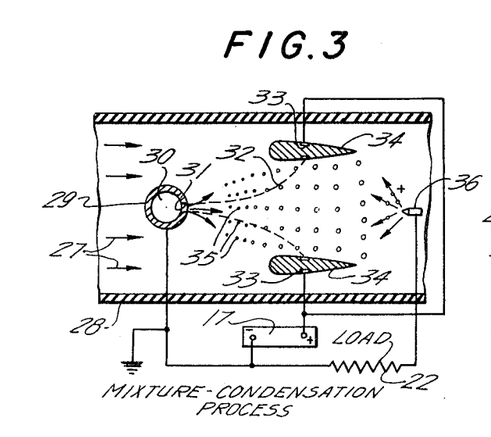

The "Mixture-Condensation Transducer" illustrated in FIG. 3 has ben previously disclosed in an application for patent, Ser. No. 438,930 filed Mar. 11, 1963. In this device a carrier gas 17 is directed through an insulating conduit 28. One or more grounded pipes 29 are transversely disposed within the conduit 28. A superheated vapor 30 under pressure is forced into the stream of the carrier gas 26 by means of a series of openings 31 in the pipe 29. The superheated vapor cools by expansion on leaving the pipe openings 31 and is further cooled by intermixture with the cooler carrier gas 27. An electric field, indicated by dashed lines 32 is set up by the application of a potential from a DC voltage source 17. The voltage source 17 is connected to elongated charging electrodes 33 which are embedded in the top and bottom surfaces of insulating airfoil sections 34 transversely disposed in the conduit 28, downstream of the emiter pipe 29. The electric field 32 is applied between the electrodes 33 and the emitter pipe 29 which gives off ions to form a corona discharge. The vapor issuing from the orifices is supercooled and intermixed with these ions. Charged droplets 35 form about individual ions and grow from the supercooled vapor. The charged droplets 35 continue to grow as they move downstream into the conversion space between the airfoil sections wherein they now have an optimum ratio.

After passing through the conversion space the charge on the droplets is neutralized by ions of opposite sign from a collector point 36 and current flows through the load resistor 22 back to the grounded emitter pipe 29. Thereafter the discharged neutral droplets may evaporate and become a neutral vapor mixed with the carrier gas 27.

To decrease frictional power losses, the carrier gas aerosol should flow at a subsonic velocity. Since cooling in this process is obtained by mixture, and not by the expansion of the carrier gas, the carrier gas-aerosol may flow at a subsonic velocity. This is in contradistinction to the "expansion condensation" process shown in FIG. 2 in which the cooling is obtained only by expansion of the carrier gas at the nozzle throat; as a result of which, the gas velocity is sonic or supersonic, and the frictional power loss excessive.

Figure 4:
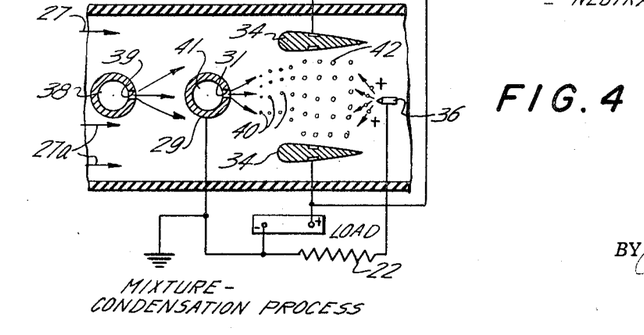

In the device shown in FIG. 4 an upstream pipe 38 is provided which contains a superheated vapor under pressure. Supercooled vapor is discharged through an orifice 39 in pipe 38 and mixed with the carrier gas stream 27 which flows in the direction of the arrows 27a. Downstream of pipe 38 is an emitter pipe 29 which also contains a superheated vapor under pressure. The superheated vapor is discharged in the form of small charged droplets 40 into the carrier gas 27. The mixture of the carrier gas, the supercooled vapor, and small charged aerosol droplets results in the vapor condensing on the droplets 40 so that they grow to attain an optimum ratio.

The control means for the growth of droplets comprises auxilliary devices for adjusting the temperature and pressure of the carrier gas, and the temperatures, pressure and flow of the supercooled vapor, or both. As in the structure shown in FIG. 3, the charged droplets function as power transducers in the conversion space between the charging electrodes and the collector electrodes.

ELECTROJET CONDENSATION TRANSDUCER

Various combinations of the electrojet and condensation processes are described hereinafter as control means for attaining a charged aerosol particle of optimum ratio.

(a) Electrojet-condensation

The transducer shown in FIG. 4 may be operated by the "electrojet-condensation process." In this process a cool liquid 41 is introduced into pie 29 and forced through nozzles 31 into an intense electric field. Insulation (not shown) may be applied to the outside of pipe 29 to prevent heat losses. The carrier gas temperature is maintained above the boiling point of the liquid 41, and the charged droplets 40 are completely evaporated, leaving only singly charged ions comprising one or more molecules.

Pipe 29 contains a liquid such as ethanol or methanol which will totally evaporate at a temperature at which another vapor, such as water may be supercooled. Simultaneously, superheated water vapor is introduced into pipe 38 and ejected through nozzles 39 to a supercooled state. When the supercooled water vapor mixes with the singly charged alcohol molecules downstream from pipe 29, the charged molecules grow in size, becoming particles 42 of optimum ratio. The rate of growth of the charged droplets and their ratio in the conversion space is controlled by the supercooling of the water vapor and the dwell time of the charged particles in the carrier gas just before entering the conversion space.

(b) Critical temperature and pressure process

The transducer shown in FIG. 4 may be operated with a process which is the same as the electrojet condensation process described above, except that the fluid within the pipe 29 is at its critical temperature and pressure. Under these conditions it is neither a vapor nor liquid but exists in an intermediate state. The electrical charges collect upon individual molecules or aggregates of a few molecules in the space adjoining pipe 29. The charged molecules or aggregates will grow by condensation as they are combined with the supercooled vapor emitted from pipe 38 into the carrier gas.

For example, the pipe 39 may contain ethanol or methanol which is emitted at its critical temperature and pressure into a carrier gas containing supercooled water vapor emitted from pipe 38.

THE NEUTRALIZATION PROCESS

Where charged aerosol droplets, produced by any of the foregoing devices and methods, have too many charges for a given radius, the droplets may be partially neutralized until the optimum ratio is obtained.

Figure 5:
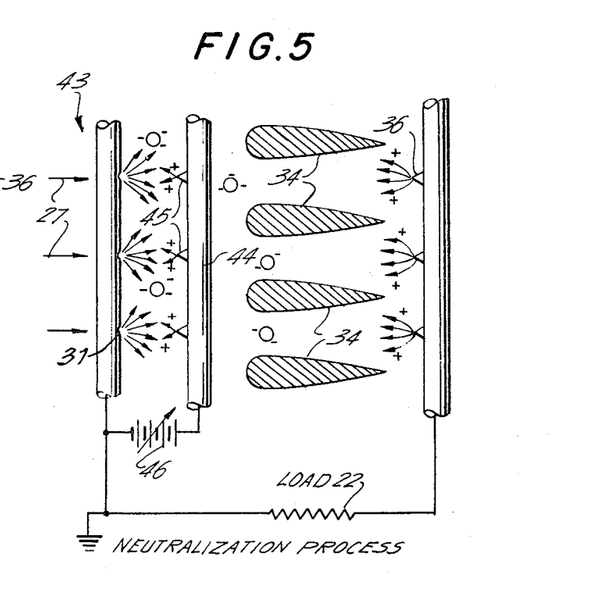

The transducer 43, a part of which is shown in FIG. 5, may be used in the neutralization process. This transducer 43 is substantially the same as that shown in FIG. 3 except that an additional electrode 44 has been added which acts as a charging electrode and partial neutralizer electrode at the same time. No electrodes are used in the nozzle or airfoil section. This electrode 44 contains one or more sharp points 45 from which a positive corona discharge may be maintained. Electrode 44 is connected to a voltage source 46.

The operation of this transducer is the same as described above in connection with FIG. 2 except that the corona discharge from points 45 decreases the charge on the aerosol droplets, and thereby increases the ratio to an optimum.

The addition of one or more ionizing electrodes 44 into any of the other transducers described herein to partially neutralize the charge on the droplets to achieve the optimum ratio is within the purview of the present invention.

FIGS. 1, 2, 3 and 4 show only one nozzle. It is obvious, however, that a large number of nozzles may be employed as described in my U.S. Pat. No. 2,638,555. In FIGS. 3, 4 and 5, the airfoil sections may also extend for some distance and many may be employed. FIG. 5 shows such an array of multiple airfoil sections 34 and orifices 31 which may be used in the transducers shown in FIGS. 3 and 4.

In all these cases, the voltage source 17 produces a potential for either a charging ring shaped electrode 16 or an airfoil section electrode 33. The current drain from such a source is quite low and the power consumed is only a small fraction of the power delivered to load 22.

LARGE MOLECULE TRANSDUCER

The "Large Molecule Process" may be practiced using the device shown and described in connection with FIGS. 1, 3 and 4. In the large molecule process, a vapor is employed having molecules with radii in range 4–40 A. herein referred to as "large molecules." These molecules should be capable of assuming a negative or positive charge by electron attachment or loss. This vapor is superheated and issues from the orifices 31 in the emitter pipe 29, and mixed with the carrier gas 27. The large molecules are preferably singly ionized as they pass through the corona field near the orifices 31.

The large molecule is selected from a suitable material which is a liquid, and forms a vapor. For a high temperature cycle this substance should be inorganic and form a stable vapor at temperatures in the range of from 1000 to 1500° K.

The large molecules may be selected from among certain of the polymeric materials known to have molecules of sufficiently large radii. In certain cases the large molecules may be dissolved or suspended in another carrier fluid such as water or ethanol which flashes into vapor as described above, leaving the singly charged larger molecules to form the charged aerosol.

The above description and drawings show many novel forms of transducers. The transducers can be operated in many ways depending upon the properties of the liquids and gases and on the required results. The common objective is a charged aerosol droplet having a very small mobility in the carrier gas, which under the conditions of operation produce an optimum ratio. To produce the most efficient transduction of electrical power from mechanical and thermal power, this ratio may vary from about 4 A. per electron charge, to about 3000 A., depending upon the conditions of operation, which will become apparent from the mathematical-physics analysis to follow.

MATHEMATICAL-PHYSICS SECTION

Table of symbols $a$=Length of dipole particles.

$A, B$=Experimentally determined constants.

$b$=Relative breakdown electric intensity for any gas—relative to hydrogen under standard conditions.

$b_g$=Relative electric breakdown factor of the carrier gas; or, the ratio of the electric breakdown potential of the carrier gas to that of air, at standard conditions.

$b_1$=Breakdown electric intensity for hydrogen under standard conditions.

$b_0$=Breakdown electric intensity for air under standard conditions.

$c$=Sonic velocity.

$c_1$=Sonic velocity for hydrogen at standard conditions—m./sec.

$D$=Nozzle throat diameter—m.

$D_1$=Molecular diameter of hydrogen (meters).

$e$=Electronic charge=$1.60 \times 10^{-19}$ coulombs.

$E$=Electric field intensity volts/m.

$E_b$=Electric breakdown field intensity (volts/meter).

$f = (D/D_1)^2$=molecular cross section relative to hydrogen.

$k = u/E$; mobility (meters$^2$/volt-sec.).

$K$=Aerosol electric breakdown factor; or the ratio of the electric breakdown potential of the charged aerosol under operating conditions compared to that of "the gas only" at the same density and temperature under static conditions.

$m$ = Molecular weight of gas or vapor (mean).
$m_r$ = Relative average molecular (or atomic) weight compared to that of air. Air has a mean molecular weight of 28.8.
M = Mach number.
$m_L$ = Molecular weight of the liquid.
N = Number of electronic charges per droplet.
$n$ = Number of particles/unit volume.
$N_o$ = Avogadro's number (molecules).
$r$ = Radius of droplet (meters).
$r_o$ = Radius of charged droplet of a given gas for $\delta_a = 1$ and $\psi = 1$.
$r_1 = [0.87\ eb_1\lambda_1/6\pi\mu_1 c_1]^{1/2} = 3.91 \times 10^{-10}$ meters, a constant.
$r_s = (0.87e/6\pi)(N\lambda/\mu k) =$ meters.
$S = (1.74\lambda/r_s)$.
$S_1 = 1.74\lambda_1/r_1$.
$T_a = T/T_0 = T/300 =$ absolute temperature based upon 300° K. as the unit temperature.
$u$ = Relative slip velocity (meters/sec.)
U = Gas velocity—meters/sec.
$X = (bNK/\alpha MT_a)^{1/2}$, a parameter Greek symbols $\alpha$ = Slippage coefficient = $KE_b/u$.
$\delta_a$ = Relative gas density; the ratio of "the density of a gas under a given pressure and temperature" to "the density of the same gas under standard conditions." 1.163 kg./m.³ or the density of air under standard conditions.
$\delta_L$ = Density of the liquid, g./cc.
$\eta$ = A number.
$\gamma = c_p/c_v$.
$\gamma_0$ = Surface tension of liquid drop newtons/m.
$\epsilon_0 = 8.85 \times 10^{-12}$—permittivity of free space farads/m.
$\mu$ = Viscosity (newtons—sec./m.²).
$\mu_1$ = Viscosity of hydrogen at standard conditions.
$\lambda$ = Mean free path (meters).
$\lambda_1$ = Mean free path for hydrogen at standard conditions.
$\psi = (1/S^2)(1+\sqrt{1+S^2})$.
$\kappa$ = Dielectric constant.

THE CHARGED AEROSOL DROPLET

Radius per electron charge

The "mobility" $k$ of a charged particle moved with a velocity $u$ through a gas by an electric field of intensity E is, by definition:

$$k = u/E \qquad (1)$$

The Stokes-Cunningham equation is:

$$k = (Ne/6\pi\mu r)(1 + 0.87\lambda/r) \qquad (2)$$

To determine $r$ under the various conditions of operation, substitutions for $k$, $u$ and $\lambda$ must be made in (2), which is then solved for $r$ and simplified.

For efficient power transduction the slip velocity $u$ must be a small fracton $\alpha$ of the carrer gas velocty $u$ and the electric field intensity E must be a maximum. Let $u = \alpha U$, and arbitrarily set $\alpha = 0.01$. Set the electric field intensity to incipient breakdown $E = E_b$. Then the mobility $k$ of a charged particle or radius $r$ is:

$$k = \alpha U/E_b \qquad (3)$$

The gas velocity U may be expressed in terms of the Mach No. of the gas M; the sonic velocity $c_1$ of hydrogen gas $H_2$ at standard conditions, the absolute temperature $T_a$, and the atomic or molecular weight of the gas, $m$:

$$U = \sqrt{2}c_1 M\sqrt{T_a/m} \qquad (4)$$

The electric breakdown voltage $E_b$ is given by:

$$E_b = b_1 bK\delta_a \qquad (5)$$

The mobility $k$ may be expressed in terms of the operating conditions, by substituting 4 and 5 into 3:

$$k = (\sqrt{2}c_1/b_1)(\alpha M/bK\delta_a)(T_a/m)^{1/2} \qquad (6)$$

According to the kinetic theory of gases the viscosity $\mu$ of any gas of molecular weight $m$ may be expressed in terms of $\mu_1$ the viscosity of $H_2$ under standard conditions:

$$\mu = (\mu_1/\sqrt{2})(\sqrt{mT_a/f}) \qquad (7)$$

While Sutherland's formula is more accurate, Formula 7 is sufficiently accurate and is preferred because the derivations hereinafter are simpler.

According to the kinetic theory of gases, the mean free path $\lambda$ may be expressed in terms of $\lambda_1$:

$$\lambda = (\lambda_1/f\delta_a) \qquad (8)$$

To solve Equation 2 for $r$, multiply by $r^2$ and use $r_s$ and S as substitutions; whereupon Equation 2 may be written:

$$r^2 - (2r_s/S)r - r_s^2 = 0 \qquad (9)$$

Solving 9 for $r$ and simplifying:

$$r = r_s S[(1/S^2)(1+\sqrt{1+S^2})] \qquad (10)$$

Table I gives certain physical constants for hydrogen gas under specified standard conditions, which are needed to evaluate the constant terms in the Equation 2.

TABLE I.—PHYSICAL CONSTANTS FOR HYDROGEN GAS FOR STANDARD CONDITIONS
[300° K. and 10⁵ newtons/m.²]

| Parameter | Symbol | Value | Units |
|---|---|---|---|
| Viscosity | $\mu_1$ | $8.89 \times 10^{-6}$ | Newton, sec./m.² |
| Mean free path | $\lambda_1$ | $1.24 \times 10^{-7}$ | Meters. |
| Sonic velocity | $c_1$ | $1.33 \times 10^3$ | Meters/sec. |
| Breakdown electric field intensity | $d_1$ | $2.00 \times 10^6$ | Volts/m. |

The molecular cross section $f$ relative to hydrogen gas is computed in Table II by solving Equation 7 for $f$ and using data on viscosity normalized to a temperature of 300° K. for the various carrier gases.

TABLE II.—RELATIVE MOLECULAR CROSS SECTION OF VARIOUS CARRIER GASES—VISCOSITIES OF GASES ARE NORMALIZED TO 300° K.

| Carrier gas | Viscosity newton, sec./m.² | $\mu/\mu_1$ | $f$ |
|---|---|---|---|
| He | $1.85 \times 10^{-5}$ | 2.24 | 0.635 |
| $H_2$ | $0.84 \times 10^{-5}$ | 1.00 | 1.00 |
| Steam | $2.60 \times 10^{-5}$ | 3.00 | 1.6 |
| Air | $1.7 \times 10^{-5}$ | 2.05 | 1.85 |
| Mercury | $2.23 \times 10^{-5}$ | ¹ 2.65 | ¹ 3.78 |

In 10 $r_s$ is evaluated in terms of standard conditions for hydrogen gas $H_2$ by substituting for $k$, $\mu$, and $\lambda$ from 6, 7 and 8 respectively, from which:

$$r_s = r_1 X \qquad (11)$$

From Table I $r_1$ is evaluated:

$r_1 = 3.91 \times 10^{-10}$ meters, or 3.91 A.

From Table I, 8 and 11, S is evaluated for hydrogen gas at standard conditions:

$$S = (1.74\lambda_1/r_1)/\delta_a = fX = 552/\delta_a \cdot fX \qquad (12)$$

From 10, using 12 and the substitution $\psi$, the general solution for $r$ is:

$$r = r_1 XS\psi = (1.74\lambda_1/f)(\psi/\delta_a) \qquad (13)$$

From 13 for any gas or vapor, the radius of the singly or multiply charged droplet is:

$$r_A = (2160/f)(\psi/\delta_a) \quad \text{(Angstroms)} \qquad (14)$$

An equation for the radius $r_A$ of the charged droplet was obtained by substituting $\psi$ as defined in the Table of Symbols, $r_1 = 3.91$ A. in Equation 13:

$$r_A = 3.91\ (X/S)(1+\sqrt{1+S^2}) \qquad (15)$$

Figure 9:
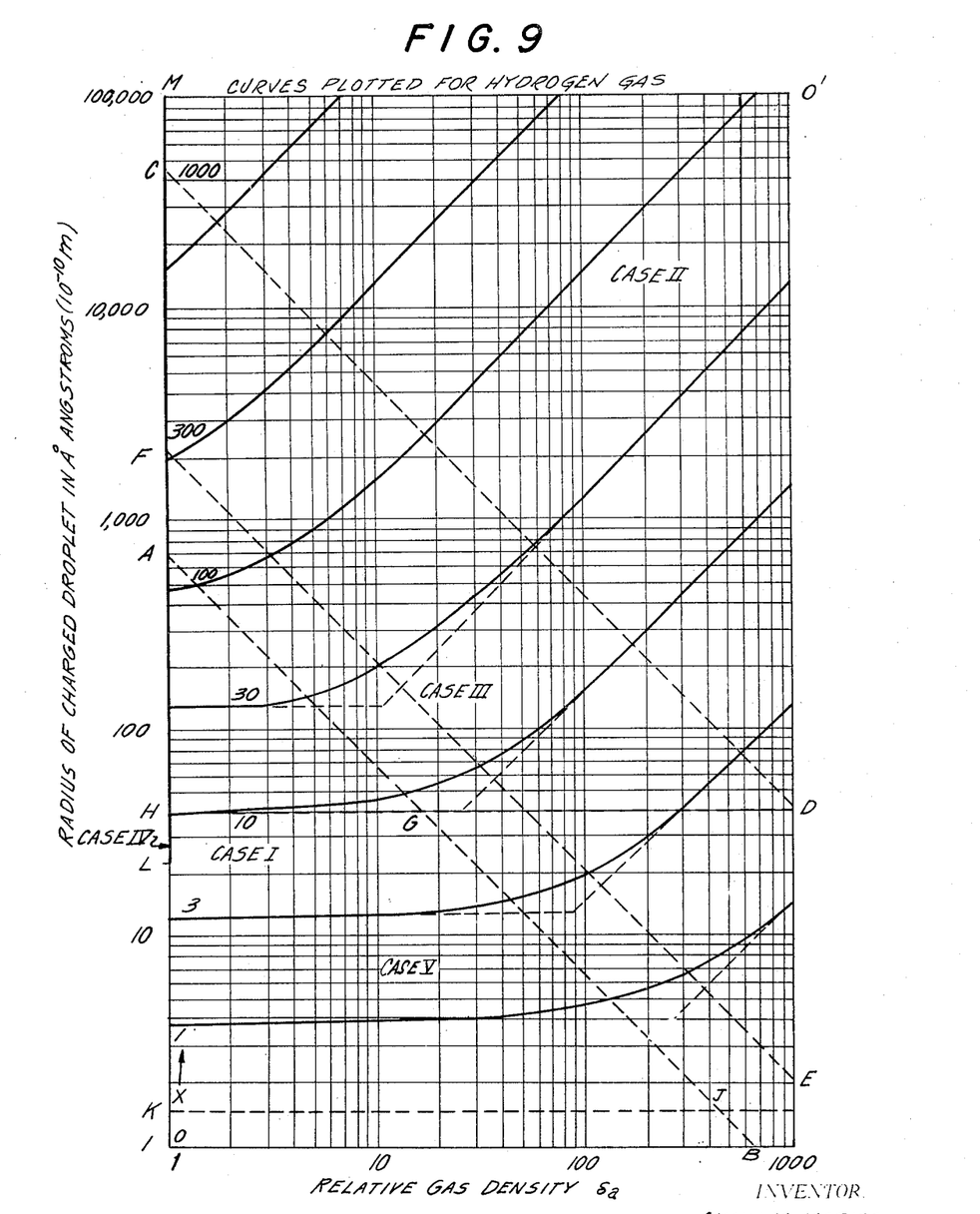
Figure 10:
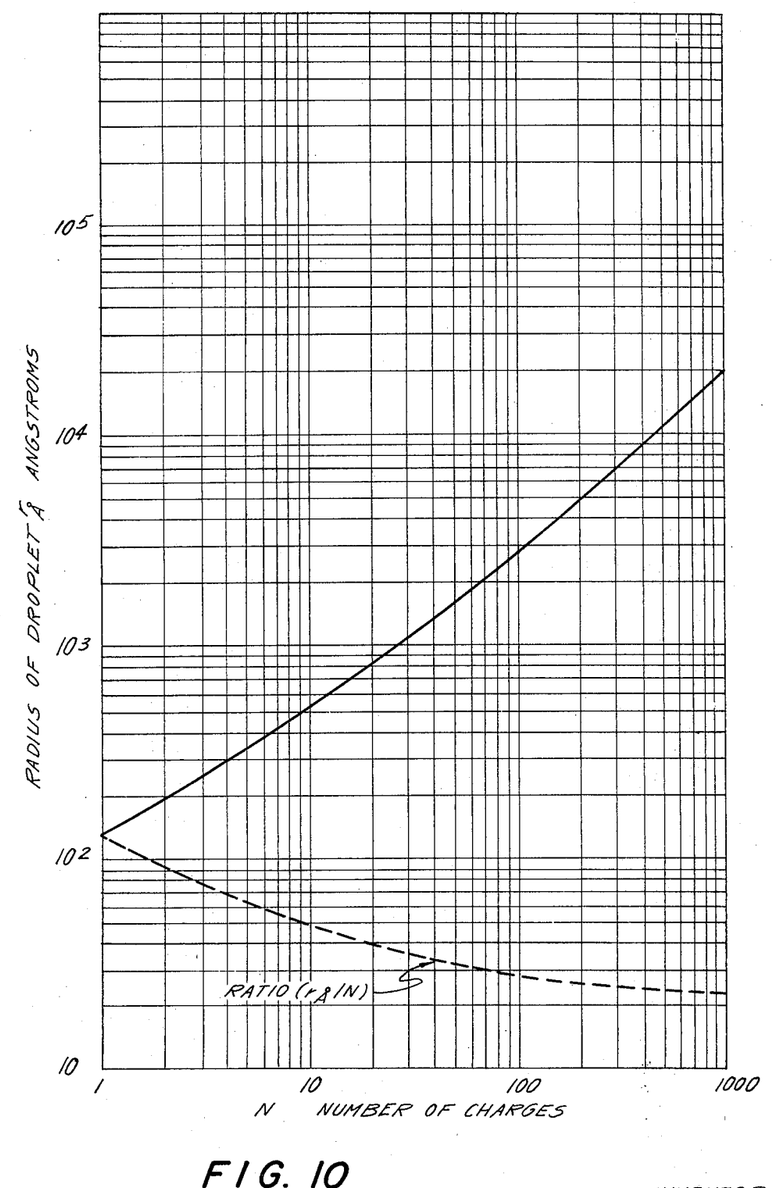

Equation 15 is plotted in FIG. 9 on a log-log scale, for $r_A$ vs. $\delta_A$ for various values of X for hydrogen for which $f=1$. This equation plots as straight lines of slopes 0 and 1 for regions defined by Cases I and II.

The following table gives the limiting physical conditions for 1 to 100 electron charges per droplet.

listed efficiency ratios $\eta_k$ and $\eta_t$ at two electric power density values $10^6$ and $10^8$ watts/m.$^2$.

(8) $f$, the relative gas cross section was taken from Table II.

(9) S was computed using Equation 12.

(10) The radius $r_A$ of the charged droplet was computed using 15.

TABLE IV.—RADIUS OF THE CHARGED DROPLET FOR EFFICIENT POWER TRANSDUCTION UNDER THE VARIOUS GIVEN PARAMETERS

| Row No. | Aerosol composition | | | | Mach. No., M | Relative density, $\delta_a$ | Relative electric bkdown strength, $bK$ | X | Relative molecular cross section, $f$ | $\eta_k$ | $\eta_t$ | Power density, watts/m.$^2$, P | Plutron charges/ drop, N | Droplet radius, $r_A$ |
|---|---|---|---|---|---|---|---|---|---|---|---|---|---|---|
| | Gas | Liquid | Inhibited | Supercooled | | | | | | | | | | |
| 1 | Air | Water | No | No | 0.084 | 238 | 1.5 | 13.4 | 1.85 | 1.0 | 0.01 | $10^6$ | 1 | 1,110 |
| 2 | Air | do | No | No | 0.212 | 151 | 1.5 | 8.4 | 1.85 | 1.0 | 0.01 | $10^8$ | 1 | 284 |
| 3 | H$_2$ | do | No | No | 0.050 | 302 | 1.0 | 14.1 | 1.0 | 1.0 | 0.01 | $10^6$ | 1 | 857 |
| 4 | H$_2$ | do | No | No | 0.125 | 190 | 1.0 | 8.9 | 1.0 | 1.0 | 0.01 | $10^8$ | 1 | 221 |
| 5 | Air | do | Yes | No | 0.11 | 105 | 3.0 | 16.5 | 1.85 | 1.0 | 0.01 | $10^6$ | 1 | 755 |
| 6 | Air | do | Yes | No | 0.28 | 66 | 3.0 | 10.4 | 1.85 | 1.0 | 0.01 | $10^8$ | 1 | 195 |
| 7 | H$_2$ | do | Yes | No | 0.063 | 141 | 1.5 | 15.4 | 1.0 | 1.0 | 0.01 | $10^6$ | 1 | 483 |
| 8 | H$_2$ | do | Yes | No | 0.16 | 89 | 1.5 | 9.7 | 1.0 | 1.0 | 0.01 | $10^8$ | 1 | 129 |
| 9 | Air | do | Yes | Yes | 0.17 | 28 | 9.0 | 23.0 | 1.85 | 1.0 | 0.01 | $10^6$ | 1 | 408 |
| 10 | Air | do | Yes | Yes | 0.44 | 18 | 9.0 | 14.3 | 1.85 | 1.0 | 0.01 | $10^8$ | 1 | 122 |
| 11 | H$_2$ | do | Yes | Yes | 0.1 | 38 | 4.5 | 21.2 | 1.0 | 1.0 | 0.01 | $10^6$ | 1 | 268 |
| 12 | H$_2$ | do | Yes | Yes | 0.25 | 24 | 4.5 | 13.4 | 1.0 | 1.0 | 0.01 | $10^8$ | 1 | 91 |
| 13 | Air | do | No | No | 0.084 | 238 | 1.5 | 42.3 | 1.85 | 1.0 | 0.01 | $10^6$ | 10 | 11,140 |
| 14 | Air | do | No | No | 0.212 | 151 | 1.5 | 26.6 | 1.85 | 1.0 | 0.01 | $10^8$ | 10 | 2,800 |
| 15 | Air | do | No | No | 0.212 | 151 | 1.5 | 8.4 | 1.85 | 0.1 | 0.1 | $10^6$ | 1 | 284 |
| 16 | Air | do | No | No | 0.535 | 95 | 1.5 | 5.5 | 1.85 | 0.1 | 0.1 | $10^8$ | 1 | 81 |
| 17 | H$_2$ | do | No | No | 0.125 | 190 | 1.0 | 8.9 | 1.0 | 0.1 | 0.1 | $10^6$ | 1 | 221 |
| 18 | H$_2$ | do | No | No | 0.313 | 120 | 1.0 | 5.7 | 1.0 | 0.1 | 0.1 | $10^8$ | 1 | 62 |
| 19 | Air | do | Yes | No | 0.28 | 66 | 3.0 | 10.7 | 1.85 | 0.1 | 0.1 | $10^6$ | 1 | 207 |
| 20 | Air | do | Yes | No | 0.71 | 42 | 3.0 | 6.5 | 1.85 | 0.1 | 0.1 | $10^8$ | 1 | 58 |
| 21 | H$_2$ | do | Yes | No | 0.16 | 89 | 1.5 | 9.7 | 1.0 | 0.1 | 0.1 | $10^6$ | 1 | 130 |
| 22 | H$_2$ | do | Yes | No | 0.40 | 55 | 1.5 | 6.1 | 1.0 | 0.1 | 0.1 | $10^8$ | 1 | 43 |
| 23 | H$_2$ | do | Yes | Yes | 0.25 | 24 | 4.5 | 13.4 | 1.0 | 0.1 | 0.1 | $10^6$ | 1 | 91 |
| 24 | H$_2$ | do | Yes | Yes | 0.63 | 14 | 4.5 | 8.4 | 1.0 | 0.1 | 0.1 | $10^8$ | 1 | 41 |

TABLE III.—RANGES OF VALUES OF X AND OTHER PARAMETERS

| Variable | Symbol | Min. | Max. |
|---|---|---|---|
| Relative gas density | $\delta_a$ | 1 | 1,000.0 |
| Relative molecular radius | $f$ | 0.63 | 5.0 |
| Temperature | $T_a$ | 1 | 5.0 |
| Mach No. | M | $5 \times 10^{-3}$ | 1.0 |
| Slip | $\alpha$ | $1 \times 10^{-2}$ | $20 \times 10^{-2}$ |
| Relative electric intensity at breakdown of charged aerosol gas. | $bK$ | 1 | 9 |
| Number of charges/particle | N | 1 | 8,000 |
| | $bKN$ | 1 | $7.2 \times 10^4$ |
| | $\alpha MT_a$ | $5 \times 10^{-4}$ | 1 |
| $bKN/\alpha MT_a$ | $X^2$ | 1 | $1.4 \times 10^8$ |
| $(bKN/\alpha MT_a)^{1/2}$ | X | 1 | $1.2 \times 10^4$ |

In Table IV the optimum radius of singly charged droplets for efficient power transduction under various operating conditions is computed for various operating conditions and for the various compositions of charged aerosol gas listed.

Various values for the listed variables were used, and the calculations were made as follows:

(1) $bK$, the electric field intensity at incipient spark breakdown, for the charged aerosols listed, are given in the table.

(2) $T_a = 2$ (600° K. or 327° C.), the temperature.

(3) M, the Mach No. computed for the sonic velocities of air and hydrogen gas at temperature $T_a = 2$, which are:

$$C_{air} = 347 \sqrt{2} = 490 \text{ m./sec.}$$

$$C_{H2} = 1330 \sqrt{2} = 1880 \text{ m./sec.}$$

The first factor is the Mach No. of the gas at 300° K. taken from standard tables.

(4) $\alpha$, the slip factor was taken as $\alpha = 5 \times 10^{-2}$ or 5%.

(5) The charged particle was singly charged, $N=1$, except as otherwise noted.

(6) The parameter $X^2$ was simplified using the values for $T_a$, $\alpha$ and N from 2, 4 and 5 respectively:

$$X^2 = bKN/\alpha MT_a = 10bK/M$$

This simplified expression was used to calculate X, except where $N>1$.

(7) Corresponding values of the Mach No. M and the relative gas density $\delta_a$ were taken from Table III, page 31 of copending application, Ser. No. 401,142, filed Oct. 2, 1964 in the name of Alvin M. Marks, for the FIG. 9 shows curves on a log-log scale for charged droplet radius $r$ versus relative gas density $\delta_a$, for the parameter X from 1 to 1000. The curves fall into well defined regions designated as Cases I through V, as hereinafter described.

Cases I through V consider the radius of the charged aerosol droplet $r$ as a function of the relative gas density $\delta_a$ for a wide range of variables which are lumped in the parameter X.

These variables are defined by $X = (bKN/\alpha MT_a)^{1/2}$. The value of $r$ versus $\delta_a$ depends on the choice of these variables. When the choice of these variables and $\delta_a$ is made for efficient operation, then these curves determine an optimum radius $r$ for the given values of N, and hence determine the optimum ratio $(r/N)$ for these conditions. The choice of values for these variables is determined by optimum operating conditions previously established and disclosed in the aforementioned copending application.

Case I

From the definition of S:

$$S^2 \gg 1 \qquad (16)$$

$$\psi = 1/S$$

Applying conditions 16 to general Equation 13:

$$r = r_1 X = r_1 (NbK/\alpha MT_a)^{1/2} \qquad (17)$$

Using 11 and expressing $r$ in A.:

$$r_A = 3.91 X \text{ Angstroms} \qquad (18)$$

In the Case I region, by 18, $r$ is proportional only to the parameter X.

Condition 16 implies from 12 that $S \geq 10^{1/2}$, and that:

$$\delta_a \cdot fX \geq 175$$

From 18 and 19 for a hydrogen gas carrier, in which $f=1$, the boundary line AB is given by:

$$\delta_a \cdot r_A = 684 \qquad (20)$$

The Case I region is thus bounded by the straight line AB plotted from 20, forming a triangular region OAB characterized by small values of relative gas density $\delta_a$ from 1 to about 20, and values of X from about 3 to 30; in which $r_A$ is nearly constant for a given value of X within the region, and independent of gas composition and density.

For a given operating condition and its corresponding optimum ratio, a singly charged droplet has the smallest radius.

Where a growth process is involved, a singly charged droplet is more quickly grown to attain the optimum ratio. The smallest radius occurs under conditions yielding the smallest values of X, which requires $N=1$. Small values of X down to about 3 occur in the Case I region.

Case I is of great importance since it establishes the conditions for the utilization of charged droplets of small radii, at small relative gas densities. Charged droplets of small radii are more readily grown and small gas densities are more readily attained.

An example of efficient operation in the Case I region is shown in row 24, Table IV, and also in FIG. 9. In this example there is shown a singly charged droplet of small radius, $r=41_A$, $X=8.4$; $\delta_a=14$; a power density of $10^8$ watts/m.$^2$; Mach No. of about 0.6; highly inhibited and supercooled hydrogen or helium; and the elevated temperature of 600° K. or more The Case II region is next defined and discussed:

Case II

From the definition of S:

$$S^2 \ll 1 \quad (21)$$

$$\psi = 2/S^2$$

From 12, 13 and 21:

$$r_A = 1.42 \times 10^{-2} \, fX^2 \cdot \delta_a \quad (22)$$

Condition 21 implies that $S \leq 0.1^{1/2}$; hence from 12 the lower bound is given by:

$$\delta_a \cdot FX = 1750 \quad (23)$$

From 23 for hydrogen gas, where $f=1$:

$$X \cdot \delta_a = 1750 \quad (24)$$

FIG. 9 shows the triangular region O'CD for Case II. In this region, for a given gas composition at constant X, the radius $r$ is proportional only to the relative gas density $\delta_a$, and may be plotted as a series of straight lines with a slope=1, with the line CD as the lower bound. The line CD from 22 and 24 is defined by:

$$\delta_a r_A = 4.32 \times 10^4 \quad (25)$$

The Case II region applies in most instances to multiply charged droplets, usually of large radius. For droplets from 200 to $10^4_A$ and relative gas densities of 5 to 200, X varies from about 10 to 400. Taking $bK=1$, $\alpha=0.05$, $T_0=2$, then: $N=X^2/20$. Hence the maximum number of charges per droplet is about $N=8000$ for a radius of about $10^4_A$ or $1\mu$.

The Case III region is defined as the area between the lines AB and CD. The Case III region is thus intermediate between Cases I and II. A useful line EF in this region is defined by $\psi=1$ for which the equation is:

Case III $$S = 3^{1/2} = 1.73 \quad (26)$$

$$\psi = 1 \quad (27)$$

From 15 for $f=1$ $$r_A = 2160/\delta_a \quad (28)$$

The line EF shown in FIG. 9 represents points on the line defined by 28.

The line EF passes through the $r$, $\delta_a$ curves where they change from slope=0 (Case I), to slope=1 (Case II).

Table IV shows that the Case III region contains most of the computed values of droplet radius versus relative gas density for the efficient operating conditions previously established.

Case IV—Optimum power transduction under atmospheric conditions

Optimum power transduction using a charged droplet under atmospheric conditions requires a small slip factor, taken herein as 2.25%. The following conditions then obtain:

$$b=1$$
$$K=1$$
$$\alpha=2.25 \times 10^{-2}$$
$$M=1/20 \, (\sim 17.3 \text{ m./s.})$$
$$f=1.85 \text{ (for air)}$$
$$L=10^{-2} \, m.=1 \text{ cm.}$$
$$\delta_a=1 \text{ (1 atmos.)}$$
$$T_a=1 \, (300° \text{ K. or } 27° \text{ C.}) \quad (29)$$

The sonic velocity for air at 300° K. and 1 atmos.=347 m./sec.

Under the given conditions, it is now required to find $r_A$ at a function of N; and $(r_A/N)$ as a function of N.

Under these given values in 14:

$$r_A = 1167\psi \quad (30)$$

Substituting these given values into $X=(bKN/\alpha MT_a)^{1/2}$ $$X=(890N)^{1/2}=29.8N^{1/2} \quad (31)$$

Using these given values and substituting 31 in 12, there is obtained:

$$S=10/N^{1/4} \quad (32)$$

From the definition of $\psi$, and from 30 and 32:

$$r_A \cong 1167 \, (N/100)(1+\sqrt{1+100/N}) \quad (33)$$

The Table V has been computed using 33:

TABLE V

[Radius $r_A$, and Ratio $(r_A/N)$ vs. N, optimum radius and ratio of charge droplets for efficient power transduction in atmospheric air at a wind velocity of 17.3 m./s. (31.3 m.p.h.)]

| N | $\psi$ | $r_A$ | $r_A/N$ |
|---|---|---|---|
| 1 | 0.110 | 128 | 128 |
| 2 | 0.163 | 190 | 95 |
| 4 | 0.244 | 285 | 71 |
| 6 | 0.312 | 363 | 61 |
| 8 | 0.373 | 435 | 54 |
| 10 | 0.45 | 525 | 52 |
| 30 | 0.93 | 1,085 | 36 |
| 100 | 2.42 | 2,820 | 28 |
| 1,000 | 20 | 23,300 | 23 |
| 3,000 | 60 | 70,000 | 23 |
| 30,000 | 600 | 700,000 | 23 |

For Case IV conditions, air density is 1.3 kg./m.$^3$. For a gas velocity of 17.3 m./s. (wind velocity), the maximum electric power density is about 3 kw./m.$^2$. Assuming 33% efficiency, an electric wind charged aerosol transducer in atmospheric air will supply an electric power density of 1 kw./m.$^2$.

Case V—Large molecule case

Large molecules, or molecular aggregates, which are preferably singly charged range from about 4 to $40_A$, are within the Case I region, but constitute the special Case V. Small singly charged droplets also fall in this range. These may be growing to attain a still larger size.

From 18, X varies between about 1 to 10 for values of $r_A$ from approximately 4 to $40_A$.

The lower bound of a singly charged large molecule capable of efficient power transduction is one having about $4_A$ radius for which $X=1$. An atomic diameter is about 1.3 A. A molecule of 4 A. radius is equivalent to about 6 atomic diameters. If the molecular structure is planar and fully packed, the large molecule will comprise 36 atoms; if cubic and fully packed, up to 216 atoms. Such a structure might comprise a crystal having a repeating atomic pattern which, because of its small size, is termed a microcrystal.

As previously described in connection with FIGS. 6 and 7, the submicron particles may be initially carried in suspension within a charged liquid droplet and the liquid subsequently evaporated, leaving behind the small singly charged large molecules, colloidal or microcrystalline aggregates. Alternatively, the submicron particles may comprise a sol of one liquid of low vapor pressure immiscible in a larger droplet of a liquid of higher vapor pressure. An example is a metal sol, for example, microdroplets, about 100 A. of mercury or gallium suspended in water droplets of 5000 A. radius.

The conditions for Case V are:

$$bk = 1$$
$$N = 1$$
$$1 < X < 10$$
$$M \cong 0.5 \quad (34)$$

The temperature is computed for this case from conditions 34, the definition of X, and 18:

$$T_a = 31/\alpha' r_A^2 \quad (35)$$

The Equation 35 yields the result that singly charged molecules or aggregates of a small radius of about 4 A. require a high temperature and large slip; for example 1800° K. and 33%, while larger singly charged aggregates of about 40 A. may operate at a moderate temperature with negligible slip.

At high temperatures, large gas velocities are obtained at a small Mach No.; for example, at 1800° K., $T_a = 6$, $M = 0.5$; hydrogen gas has a velocity of $$0.5 \times 1330\sqrt{6} = 1640 \text{ m./sec.}$$

Thus, having a small radius, a singly charged molecule or aggregate may be used with enough temperature and relatively large slip; whilst the larger singly charged aggregates are preferred since they operate under moderate conditions with negligible slip.

Since Case V falls within the case I region, X is almost independent of $\delta_a$. This is particularly true where $X < 3$, for which X is almost constant for a relative gas density from about 1 to 100.

ELECTRICAL DISRUPTION OF CHARGED DROPLETS

For a charged droplet produced by electrical disruption, N, the maximum number of electron charges for a stable sphere of radius r is:

$$N = (8\pi\epsilon_0^{1/2}/e)\gamma_0^{1/2} r^{3/2} \quad (36)$$

$$N = 4.69 \times 10^{14} \gamma_0^{1/2} r^{3/2} \quad (37)$$

The Equation 36; considers, for a multiply charged droplet, the balance of cohesive effect of surface tension and the disruptive effect of the electrical repulsion due to surface charges.

As the temperature of the charged liquid droplet increases, the surface tension decreases, and the thermal agitation of the molecules of the charged droplet increases. Further disruption of the charged droplet results, and its charge is distributed over many smaller droplets.

Using the value of 0.073 newtons/m. for $\gamma_0$ the surface tension of water at 20° C., and expressing the water droplet radius in Angstroms, the maximum number of electron charges per droplet at 20° C. is:

$$N \cong r_A^{3/2}/8 \quad (38)$$

For a charged droplet of a radius $r_A = 1\mu$ or $10^4$ A., formed by electrical disruption at 20° C., there are thus $1.25 \times 10^5$ electrons per droplet. The ratio is then from 38:

$$(r_A/N) = 8/r_A^{1/2} \quad (39)$$

According to Equation 39, a droplet with a radius of 64 A. will have a ratio of only 1, which requires 64 electron charges. With a droplet of smaller radius, for Example 9 A., the equation predicts that the ratio will be 3 or about 3 electron charges. However, only 1 electron charge per droplet is possible below 25 A. Hence it appears that Equation 38 is not applicable to charged droplets of radius less than 25 A. and having less than about 16 charges. With a larger droplet, the ratio will decrease to less than 1. For $r_A = 10^3$ A. the ratio is 0.25. For $r_A = 10^4$ A. $= 1\mu$ the ratio is 0.08.

Referring to Table IV, droplets of larger radius for example 1000 A. may be used provided they have a ratio of about 1000 A./electron charge. For this radius this ratio is 4000 times that normally produced by electric disruption of a charged droplet at room temperature.

For a multiply charged droplet produced by electrical disruption, however, the ratio increases as the temperature increases. This is because its surface tension decreases with temperature, at temperatures and pressures less than critical; but as the boiling or flash point of the liquid droplet is approached, the internal pressure and/or vapor pressure within the drop is an additional cause for disruption. This internal pressure also opposes the cohesive effect of surface tension. Moreover, as evaporation proceeds with a multiply charged droplet, the droplet radius decreases but the charge remains constant, until electrical forces cause the droplet to become unstable and to disrupt, providing many charged droplets of smaller radii with the charges divided amongst them. Thus the ratio may be increased by the various processes herein discussed for augmenting droplet disruption.

The variation of surface tension with temperature is known for various liquids. An empirical formula due to Van der Waals is:

$$\gamma_0 = A[1-(T/T_c)]^B \quad (40)$$

where A and B are constants.

For water, the critical temperature $T_c = 647°$ K. at 217.5 atmospheres. Equation 40 becomes:

$$\gamma_0 = 75.6 \times 10^{-3}[1-(T/647)]^{1.2} \text{ newtons/m.} \quad (41)$$

Equation 41 shows that the surface tension decreases with temperature and approaches zero as the droplet temperature approaches the critical temperature. At this point the charged droplet evaporates from the liquid to the vapor state. One or a few charges then reside on the vapor molecules.

The presence of a single charge on the droplet greatly stabilizes the droplet even under otherwise superheated vapor conditions. As the temperature and superheat increases, evaporation of liquid from the charged drop will occur until equilibrium is reached at a smaller radius.

A droplet formed at a low temperature $T_1$ has a stable radius $r_1$, and $N_1$ electron charges corresponding to a surface tension value of $\gamma_1$ at that temperature. If the temperature increases to $T_2$, then the surface tension decreases to $\gamma_2$. The droplet will now only support a smaller number of charges N'. The excess number of electron charges $(N_1 - N')$ produces an excess electric force of repulsion which disrupts the droplet into $n$ smaller droplets with an average charge $N_2$:

$$N_2 = N_1/n \quad (42)$$

The volume of the droplet is proportional to $r^3$, hence $n$, the number of droplets of radius $r_2$ produced by disruption from a droplet of initial radius $r_1$, is:

$$n = (r_1/r_2)^3 \quad (43)$$

Hence the new ratio $(r_2/N_2)$ in terms of the old ratio $(r_1/N_1)$ is from 42 and 43:

$$(r_1/N_2) = (r_1/N_1)n^{2/3} \quad (44)$$

From 44 for 1 electron/drop $N_1 = n$:

$$r_2 = r_1/N_1^{1/3} \quad (45)$$

For example, a charged droplet has a radius $$r_1 = 1\mu = 10^4 \text{ A.}$$

and has $N = 1.25 \times 10^5$ electrons.

The initial ratio $(r_1/N) = 0.08$ A./electron is too small.

If this charged droplet is then disrupted into $n=N$ droplets the radius $r_2$ is found from 45:

$$r_2 = 10^4/(1.25 \times 10^5)^{1/3} = 10^4/50 = 200 \text{ A.}$$

It has been shown that a charged droplet which has a small ratio, such as 0.08 A./electron charge, is not suitable for effective power transduction. In this example, however, the disruption process produces charged droplets with a ratio of 200 A./electron, which has the required order of magnitude for efficient power transduction.

A large electric field intensity in the formation and charging region may produce an induced dipolar electrical force which elongates and tears the droplet apart. This may occur during the "Intense Electric Field Process."

The structures shown in FIGS. 1 through 7 are miniature for the 50,000–500,000 volt range at electric power densities from 1 to 10 kw./cm.$^2$. For example, for 10 kw./cm.$^2$, the distance L between the charging electrode and the collector electrodes is about 1 mm. for an output voltage of about 100 kv., and a current density 0.1 amp./cm.$^2$. In this case the charging and formation of the charged aerosol takes place in a space of about ½ mm. upstream of the throat entrance, at about 500 m./sec. During this time the singly charged aerosol droplets must attain an optimum radius, for example of about 60 A., in a time of about 1 microsecond. In the condensation process, for growth to the optimum radius, since time is the important factor, only singly charged particles may be used. Small charged particles of optimum radius may also be produced in a microsecond by an electrojet process hereinbefore disclosed.

EFFECTS OF DIPOLAR PARTICLES

When conductive dipolar particles of length $a$ are oriented by the electric field parallel to the flow axis in the conversion space, induced dipoles are produced. Induced dipoles are related to the dielectric constant $\kappa$, by the well known formula:

$$(\kappa-1)(\kappa+2) = (4\pi/3)na^3 \qquad (46)$$

Solving Equation 46 for $\kappa$:

$$\kappa = [1+(8\pi/3)na^3]/[1-(4\pi/3)na^3] \qquad (47)$$

The dielectric constant increases rapidly as the denominator of 47 approaches 0. In the limit:

$$na^3 = \tfrac{3}{4}\pi = 0.239 \qquad (48)$$

For a current density $i$, the number of singly charged particles per m.$^3$ is given by the following:

$$n = (1/e)(i/U) \qquad (49)$$

$$n = 6.25 \times 10^{18}(i/U) \text{ particles/m.}^3 \qquad (50)$$

From 48 and 49:

$$a = [(3e/4\pi)U/i]^{1/3} \qquad (51)$$

Evaluating 51 and expressing $a$ in A.:

$$a_A = 3.37 \times 10^3 (U/i)^{1/3} \qquad (52)$$

EXAMPLE

Given:
  $i = 1.35 \times 10^4$ amps./m.$^2$ (1.35 amp./cm.$^2$)
  $U = 500$ m./sec.

Find:
  (1) $a$, the dipole length
  (2) $n$, the number of particles/m.$^3$

Answers:
  (1) From 52:
    $a_A = 3.37 \times 10^3 (500/1.35 \times 10^4)^{1/3}$
    $a_A = 1120$ A.
  (2) From 50:
    $n = 6.25 \times 10^{10}(1.35 \times 10^4/500)$
    $n = 1.69 \times 10^{20}$ particles/m.$^3$ The following equations for peak voltage V, and power density $p$, as a function of the length of the conversion space L, current density $i$, and velocity gas charged aerosol, are given in columns 7 and 8 of U.S. Pat. No. 2,638,555, in which $\kappa$ was taken as unity for a nondipolar charged aerosol gas. The revised formula for the voltage V given herein takes into account a dielectric constant greater than unity:

$$V = iL^2/2\kappa\epsilon_0 \qquad (53)$$

The new formula for power density also includes the dielectric constant:

$$p = i^2L^2/2\kappa\epsilon_0 U \qquad (54)$$

From 53 and 54 it follows that relative to $\kappa=1$ for a given power level, the current density is increased by $\sqrt{\kappa}$ and the output voltage decreased by $\sqrt{\kappa}$.

The dielectric constant may take on any value in excess of 1. For example, the dielectric constant of water is 81. Under certain conditions approaching the limit 48, $\kappa$ may exceed $10^3$. Certain crystal materials may have a dielectric constant of several thousand.

In most dielectric media containing dipoles, the increase of dielectric constant due to the dipole effect is a result of dipole alignment and a charge displacement which occurs in the molecules of a liquid or crystal structure. In the present case, the charge displacement occurs in the oriented rod-like conductive particles. The result, however, is the same.

The dipole effect may be obtained with spherical particles as well as with rod-like particles. However, the spherical particles have a much greater volume than rod-like particles. The extra volume does not contribute to the dipole effect. The dipole effect is thus preferably obtained with a thin rod-like particle, for example, having a length/width ratio of between 10 and 100; because the greater the length/width ratio, th smaller is the proportion by volume and by mass of the dipolar particles.

If, for a given power density, the dielectric constant $\kappa$ for the charged dipolar particles in the conversion space=900 the current density is increased by a factor of 30, and the output voltage decreased by a factor of 30. Alternatively, using the same voltage and current density the length of the conversion space may be increased by $\sqrt{\kappa}$.

A low voltage, high current charged aerosol generator is needed for many applications. Charged dipolar particles of appropriate length and number per unit volume, as hereinabove described along with the principles hereinabove described, provides this result.

RESULTS OF ANALYSIS

The preceding mathematical-physics study has enabled the following conclusions to be drawn relating to the optimum ratio of the charged particles, as a function of the operating conditions:

(a) Charged droplets having an optimum ratio and the least radii are obtained with single charges.

(b) The optimum ratio is a function of the electric/kinetic power conversion ratio, $\eta_k$. This is shown in Table IV, rows 1 through 12, where for $\eta_k=1$, the optimum singly charged droplet radius varies from 91–1110 A. for diverse charged aerosol-gas compositions and states. Charged droplets having such ratio may be produced by an electrojet process, as hereinbefore described. In rows 15 through 24, where for $\eta_k=0.10$ the optimum radius for a singly charged droplet varies from 41–284 A. For these smaller optimum ratios, the condensation or electrojet processes may be used as hereinbefore described. The optimum ratio decreases by a factor of 1.5 to 3 when the ratio $\eta_k$ is decreased by a factor of 10.

The reason for the decrease in optimum ratio as $\eta_k$ is decreased is that a smaller electric field intensity is then required to convert a smaller proportion of the kinetic power to electric power. As the electric field intensity is decreased, the slip of the charged droplet is decreased and a smaller radii will suffice.

When operating with a gas flywheel cycle or with series stages, a smaller electric/kinetic power ratio can be utilized without detriment to the overall efficiencies.

(c) The optimum ratio is a function of the electric power density. With greater electric power density the gas velocity (Mach number) is larger and the relative gas density is smaller. Electric power densities of $10^8$ watts/m.$^2$ require singly charged droplets from 41 to 284 A. Electric power densities of $10^6$ watts/m.$^2$ require singly charged droplets of radii from 195 to 1110 A.

The optimum ratio decreases by a factor of 2 to 4 times with an increased electric power density of 100 times from $10^6$ to $10^8$ watts/m.$^2$. These trends appear even though the relative electric breakdown strength of the gas varies from 1 to 9. The greatest electric power densities, for example $10^8$ watts/m.$^2$ may result in Case I operation (see row 24).

(d) A smaller range of the optimum ratio from 41–81 A. electron charge is obtained with a combination of $b$ and $c$; that is, a small electric/kinetic power conversion ratio of 0.1, and large power density of $10^8$ watts/m.$^2$.

(e) Under Case I conditions, usually at relative gas densities from 8 to 15, the optimum ratio is small (40 to 80), particles are singly charged, and the optimum ratio is independent of gas composition and density in this range.

(f) Under Case II conditions, usually at relative gas densities from 15 to 300, the optimum ratio is proportional to relative gas density, the gas molecule cross section, the electric breakdown factor; and inversely proportional to slip, Mach No. and absolute temperature.

(g) Most efficient operating conditions at any relative gas density usually fall in a Case III region, which is between Cases I and II.

(h) Case IV refers to power transduction at atmospheric pressure. Under atmospheric conditions a power transduction of about $10^3$ watts/m.$^2$ may be obtained at 33% efficiency with an optimum ratio of 128 for singly charged particles; to a maximum optimum ratio of 23 for large multiply charged particles.

(i) Case V refers to power transduction under conditions utilizing small singly charged molecules or particles of a radii of 4–40 A. which may be used at temperatures from 1200–1800 K. ($T_a$=4 to 6) and slip factors up to 33%.

(j) For a charged aerosol comprising air and water, with no inhibitor, and no supercooling, operating at an electric power density of $10^8$ watts/m.$^2$, row 16 of Table IV shows that a singly charged particle having a radius of 81 A. is required, at a relative gas density 95 and a Mach No. of 0.535. In row 18 of the same table, a charged aerosol comprising for hydrogen gas and water, with no inhibitor and no supercooling at a relative gas density of 120 and a Mach No. of 0.313, a smaller singly charged particle of 62 A. radius is required. These conditions are important because they can be realized with an ordinary carrier gas without an inhibitor and without supersaturation.

(k) By employing dipolar particles of appropriate length and concentration, the dielectric constant $\kappa$ may be greatly increased. For constant power output, the current density is increased by a factor of $\sqrt{\kappa}$; and the voltage is decreased by a factor of the $\sqrt{\kappa}$. Alternatively, for the same voltage and current, the length of the conversion space may be increased by a factor of the $\sqrt{\kappa}$.

The various processes disclosed herein may now be employed by those skilled in the art, to achieve the optimum ratios disclosed hereunder for various conditions of operation, as well as a larger dielectric constant for applications requiring a low voltage, high current density charged aerosol generator.

Having thus fully described the invention what is claimed as new and desired to be secured by Letters Patent of the United States is:

1. A power transducer comprising a conduit for a moving gas, a source of gas connected to said conduit, means to introduce a fluid into the conduit, a source of fluid connected to the introducing means, a charging electrode spaced from the fluid introducing means and downstream thereof, a source of potential difference connected between the charging electrode and the fluid introducing means to establish an electric field between the charging electrode and the fluid introducing means, whereby gas entrained charged droplets are initially formed within the conduit, means including varying the thermodynamic and electrical conditions and the composition of the fluid to modify the charging and formation of the initially charged droplets so that the ratio of droplet radius to the number of charges per droplet is an optimum ratio for efficient power transduction, a power conversion space to receive the modified droplets, the said charging electrode being at the entrance to the conversion space, a discharging electrode at the exit to the conversion space to discharge the modified charged droplets, and an electrical circuit connected between the discharge electrode and the fluid introducing means.

2. A device according to claim 1, in which the fluid is contained within a tube at a low temperature whereby multiply charged droplets are initially produced and in which the carrier gas is at an elevated temperature, said droplets being introduced into said carrier gas, thereby increasing in temperature within the carrier gas stream and decreasing their surface tension causing them to disrupt to form smaller charged droplets.

3. A device according to claim 1 in which the said fluid is introduced as a liquid at high pressure and temperature, and wherein said carrier gas is near the same temperature and at a lower pressure, whereby the multiply charged droplets which are initially formed within the carrier gas are flash disrupted into smaller droplets and their charge divided amongst the many smaller droplets each having an optimum ratio.

4. A device according to claim 1 wherein the fluid comprises a low boiling and a high boiling fluid component which initially produces multiply charged droplets whereby upon evaporation of the low boiling component smaller droplets of the higher boiling component of optimum ratio are produced.

5. A device according to claim 4 in which the low boiling and high boiling fluids are acetone and water respectively.

6. A device according to claim 4 in which the low boiling and high boiling fluids comprise a low boiling alcohol and water respectively.

7. A device according to claim 1 in which the fluid contains a surfactant.

8. A device according to claim 7 in which the surfactant is nonionic.

9. In a device according to claim 1, in which the fluid contains aggregates, whereby an initially multiply charged droplet containing small aggregates is produced, the fluid of said droplet evaporating to leave smaller charged aggregates of optimum ratio dispersed within the carrier gas.

10. A device according to claim 9 in which said aggregates are microcrystals having dimensions between 50 A. to 5000 A.

11. A device according to claim 9 in which said aggregates are polymer macromolecules.

12. A device according to claim 1 in which the initially multiply charged droplets comprise a fluid containing an immiscible fluid component as a suspension of submicron droplets of a high boiling immiscible liquid within a low boiling liquid, whereby the low boiling liquid of the said initially multiply charged droplets evaporates producing smaller charged droplets of the said high boiling liquid which have an optimum ratio dispersed in the carrier gas.

13. A device according to claim 9 in which said aggregates are rod-like in shape and have a length/width ratio exceeding 10 to 1, comprising charged dipolar particles dispersed in the carrier gas.

14. A device according to claim 13, in which the charged dipoles are oriented within said conversion space by the electric field therein, whereby a larger dielectric constant $\kappa$ is obtained, and whereby for constant power density the voltage is decreased by a factor of $\sqrt{\kappa}$, and the current density is increased by a factor of $\sqrt{\kappa}$.

15. A charged aerosol power transducer according to claim 13 in which the charged aggregates comprise dipolar charged particles, said dipolar charged particles being oriented parallel to the flow axis of the conversion space by the electric field therein thereby producing a charge displacement within the said dipoles whereby the effective dielectric constant $\kappa$ is increased.

16. A charged aerosol according to claim 13 containing $n$ charged dipolar particles/unit volume each of the length $a$ units, in consistent units, means to increase the dielectric constant $\kappa$, comprising selecting $n$ and $a$ such that the product $na^3$ approaches but does not exceed $(\tfrac{3}{4}\pi)$.

17. A device according to claim 1 in which the gas is a relatively cool carrier gas flowing through the conduit, the fluid introducing means comprises a first and a second fluid introducing means said first fluid introducing means containing a superheated vapor at elevated temperature and pressure within said conduit, a charging electrode downstream of said fluid introducing means, a source of electric potential connected between the charging electrode and the fluid introducing means to apply an intense electric field therebetween whereby a corona discharge is produced, the second fluid introducing means disposed upstream of said first fluid introducing means, said second fluid introducing means containing a superheated vapor at elevated temperature and pressure which is introduced into the carrier gas, said carrier gas being at a somewhat lower temperature and pressure, whereby said vapor from said first fluid introducing means within said corona forms small singly charged particles within supercooled vapor from said second fluid introducing means whereby said small particles are caused to grow to obtain an optimum ratio.

18. A device according to claim 17 in which the carrier gas temperature so exceeds the fluid temperature that the multiply charged droplets initially formed from said first fluid introducing means are evaporated and disrupt into smaller charged particles but in which said carrier gas contains a vapor capable of condensing upon the particles to produce by growth condensation charged droplets of optimum ratio.

19. A device according to claim 1 in which the fluid is introduced at the critical temperature and pressure of said fluid into a carrier gas at lower temperature and pressure so that charged droplets are formed within said carrier gas having an optimum ratio.

20. A charged aerosol power transducer device according to claim 1 in which the charging electrodes are pointed, and the said charging electrodes emit a corona of opposite sign to that of the charges of the multiply charged droplets, and whereby the ions from said charging electrode collide with and partially neutralize such multiply charged droplets whereby said droplets attain an optimum ratio.

21. In a device according to claim 1 in which the fluid contains large molecules having a radius between 4 A. and 40 A. whereby a charged aerosol gas entrained molecule having a single charge thereon is formed, said charged aerosol operating at Mach No. 0.5–0.8, temperature in excess of 1200° K. and a slip between 10–33%, whereby the optimum ratio of radius of the said large molecules per charge is achieved.

22. A device according to claim 21 in which said large molecules are singly charged from a corona, and wherein said large molecules are intermixed with the carrier gas.

23. A device according to claim 21 wherein said molecules are charged by a fluid introducing means comprising a tube having an orifice, said molecules being carried by the fluid within a tube leading to said orifice, and moving into a corona downstream of the orifice.

24. A device according to claim 23 in which the fluid within said tube contains large molecules, and in which said carrier fluid is caused to evaporate upon leaving the tube, whereby the charged large molecules remain dispersed within the said carrier gas.

25. A device according to claim 13, in which the charged dipoles are oriented within said conversion space by the electric field therein, whereby the voltage is decreased and the current density increased.

26. An electrothermodynamic working substance comprising an anisotropic charged aerosol containing a suspension in a carrier gas of charged dipolar particles oriented in an electric field.

27. An electrothermodynamic working substance according to claim 26, in which the charged dipolar particles have an optimum ratio.

References Cited

UNITED STATES PATENTS

| | | | |
|---|---|---|---|
| 3,191,077 | 6/1965 | Marks et al. | 310—5 |
| 3,225,225 | 12/1965 | Wattendorf | 310—6 |

DAVID X. SLINEY, Primary Examiner